US012650506B2

(12) United States Patent　　　　(10) Patent No.:　　US 12,650,506 B2
Hocker et al.　　　　　　　　　　　　(45) Date of Patent:　　　Jun. 9, 2026

(54) RADAR SPEED DETECTION SYSTEM AND METHOD

(71) Applicant: Applied Concepts, Inc., Richardson, TX (US)

(72) Inventors: Steven F. Hocker, Gardner, KS (US); Stanley A. Walker, Flower Mound, TX (US)

(73) Assignee: APPLIED CONCEPTS, INC., Richardson, TX (US)

( * ) Notice: Subject to any disclaimer, the term of this patent is extended or adjusted under 35 U.S.C. 154(b) by 0 days.

(21) Appl. No.: 19/306,223

(22) Filed: Aug. 21, 2025

(65) Prior Publication Data

US 2026/0056309 A1　　Feb. 26, 2026

Related U.S. Application Data

(60) Provisional application No. 63/685,446, filed on Aug. 21, 2024.

(51) Int. Cl.
*G01S 13/931*　　　(2020.01)
*G01S 13/60*　　　(2006.01)

(52) U.S. Cl.
CPC .................................... *G01S 13/60* (2013.01)

(58) Field of Classification Search
CPC .............................. G01S 13/60; G01S 13/931
See application file for complete search history.

(56) References Cited

U.S. PATENT DOCUMENTS

2004/0222921 A1 * 11/2004 Aker ..................... G01S 13/931
　　　　　　　　　　　　　　　　　342/104
2025/0035778 A1 * 1/2025 Nepal ..................... G01S 7/414

* cited by examiner

*Primary Examiner* — Timothy A Brainard
(74) *Attorney, Agent, or Firm* — Jackson Walker LLP; Christopher J. Rourk

(57)　　　　　　　ABSTRACT

A system for radar speed detection, comprising a front antenna system configured to transmit a first radar signal and to receive a reflected first radar signal, a rear antenna system configured to transmit a second radar signal and to receive a reflected second radar signal, a patrol speed system configured to generate a patrol speed and a logic processing system configured to identify first vehicle signals in the reflected first radar signal and second vehicle signals in the reflected second radar signal and to eliminate signals as a function of the first vehicle signals, the second vehicles signals and the patrol speed.

20 Claims, 3 Drawing Sheets

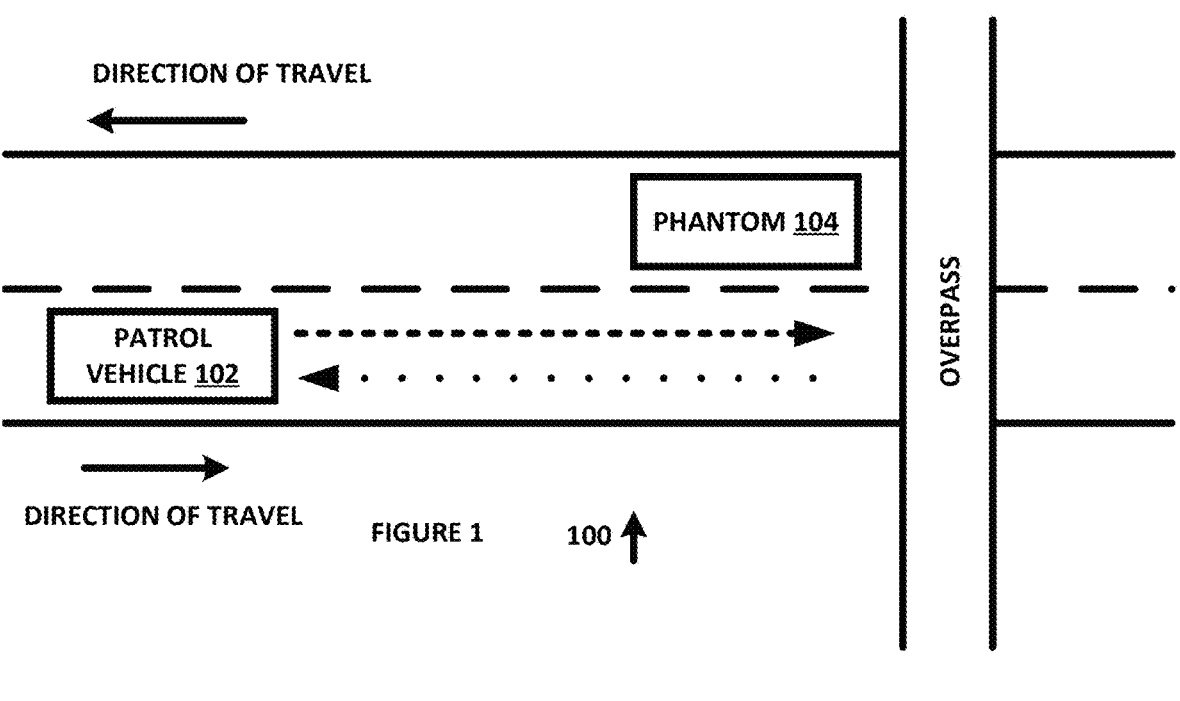
DIRECTION OF TRAVEL
PHANTOM 104
PATROL
VEHICLE 102
DIRECTION OF TRAVEL
FIGURE 1    100
OVERPASS
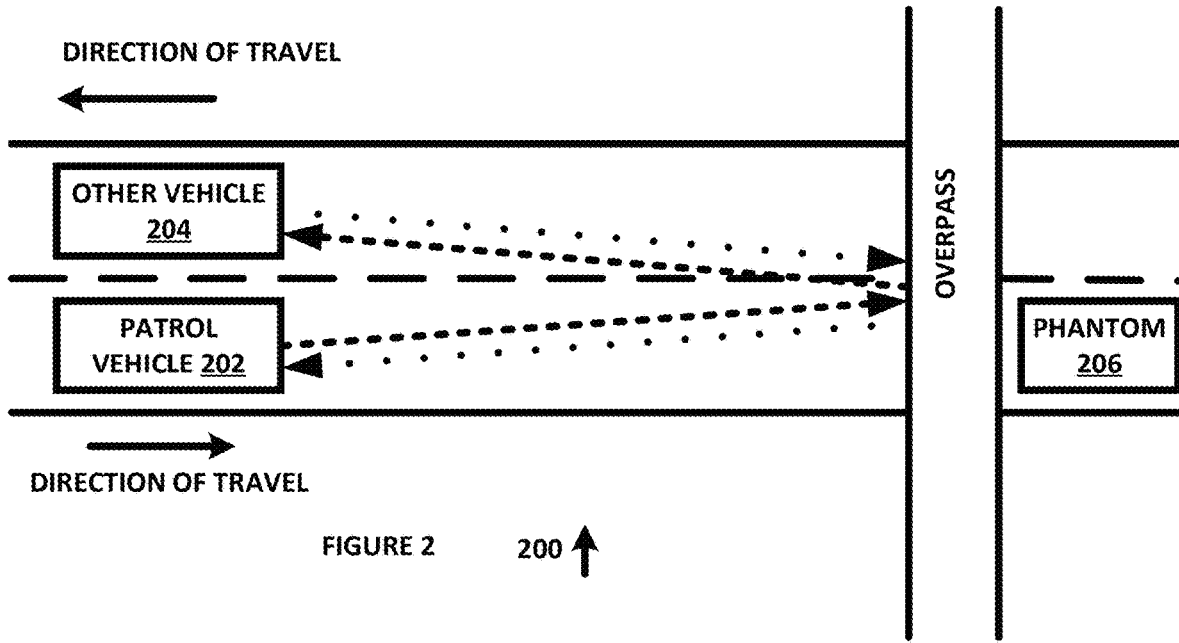
DIRECTION OF TRAVEL
OTHER VEHICLE
204
PATROL
VEHICLE 202
DIRECTION OF TRAVEL
OVERPASS
PHANTOM
206
FIGURE 2    200

DIRECTION OF TRAVEL
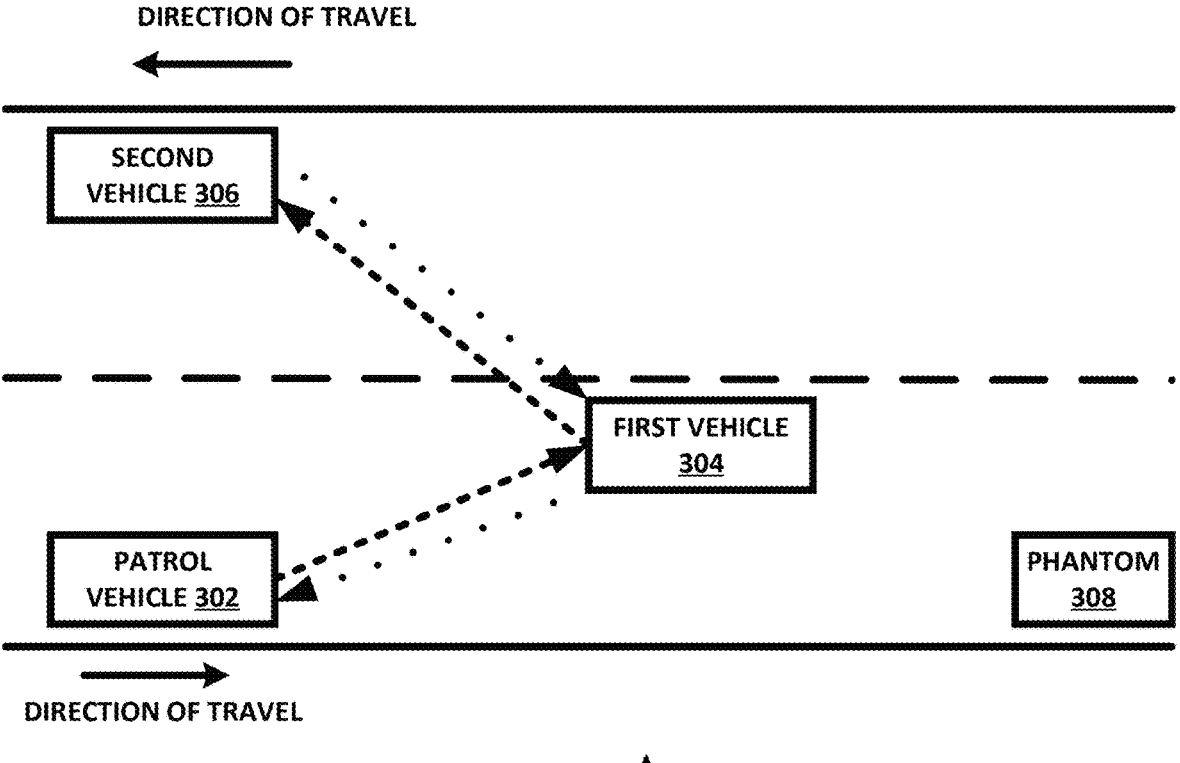
FIGURE 3        300 ↑
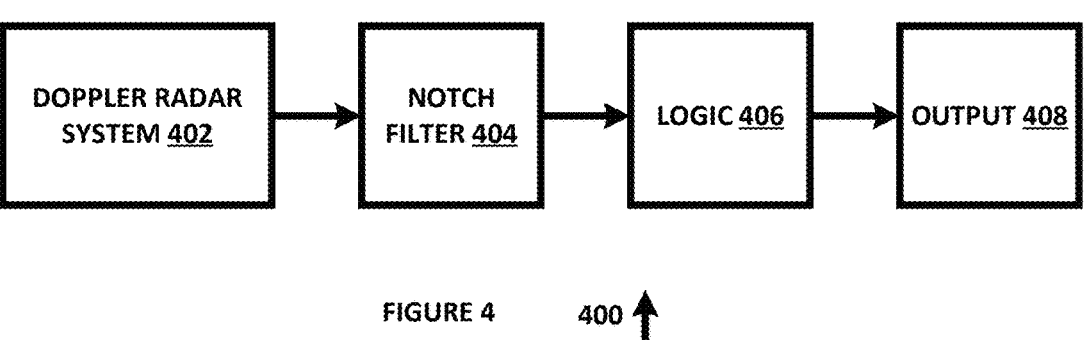
FIGURE 4        400 ↑

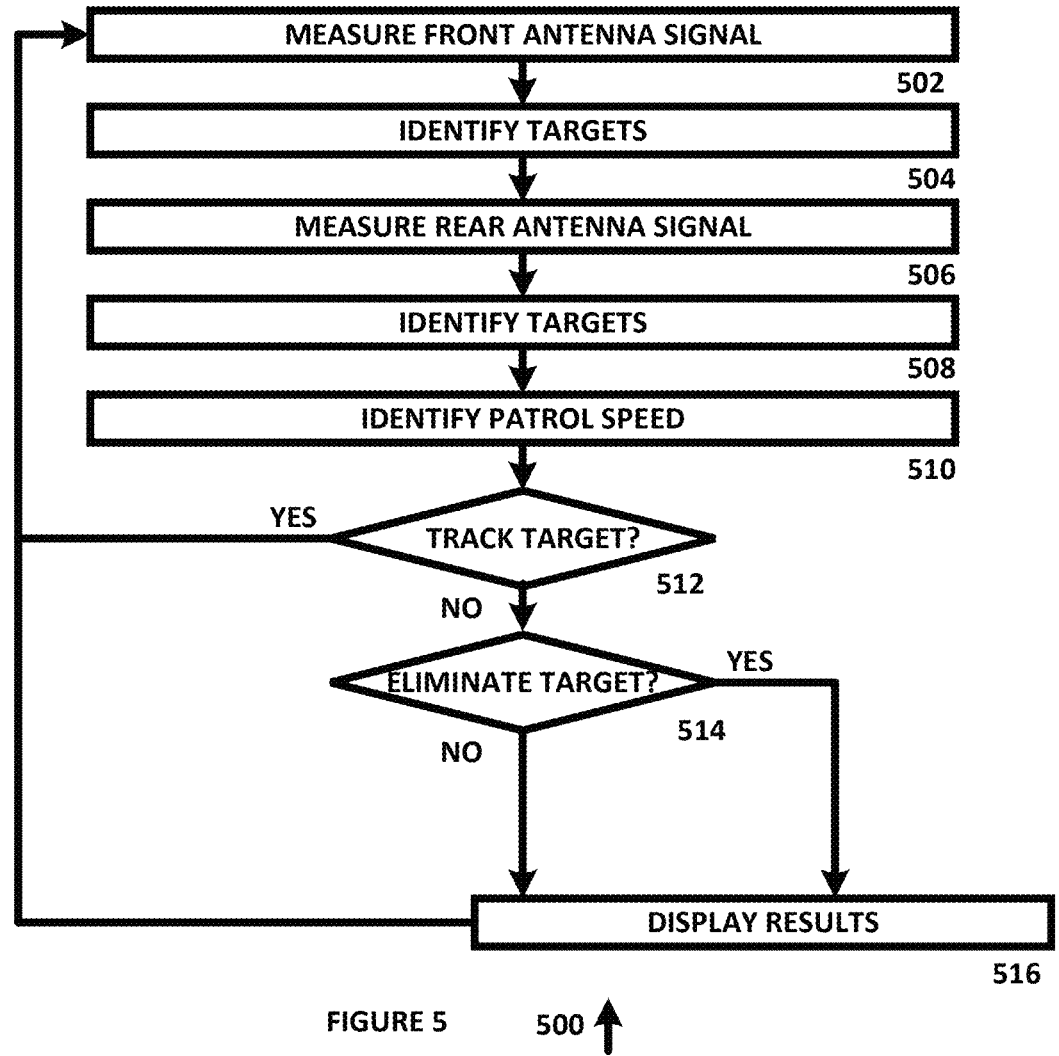
FIGURE 5     500

RADAR SPEED DETECTION SYSTEM AND METHOD

RELATED APPLICATIONS

This application claims benefit of and priority to U.S. Provisional Patent Application No. 63/685,446, filed Aug. 21, 2024, which is hereby incorporated by reference for all purposes as if set forth herein in its entirety.

TECHNICAL FIELD

The present disclosure relates generally to police speed detection radar, and more specifically to police speed detection radar with improved speed detection range.

BACKGROUND OF THE INVENTION

Radar speed detection systems have limited speed detection ranges.

SUMMARY OF THE INVENTION

A system for radar speed detection is disclosed that includes a front antenna system that is configured to transmit a first radar signal and to receive a reflected first radar signal. A rear antenna system is configured to transmit a second radar signal and to receive a reflected second radar signal. A patrol speed system is configured to generate a patrol speed, and a logic processing system is configured to identify first vehicle signals in the reflected first radar signal, such as a real vehicle, and second vehicle signals in the reflected second radar signal, such as a phantom vehicle, and to eliminate signals for the phantom vehicle as a function of a logical combination of the first vehicle signals, the second vehicles signals and the patrol speed.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which:

FIG. 1 is a diagram of a vehicle configuration illustrating concepts related to an example embodiment of the present disclosure;

FIG. 2 is a diagram of a vehicle configuration illustrating concepts related to an example embodiment of the present disclosure;

FIG. 3 is a diagram of a vehicle configuration illustrating concepts related to an example embodiment of the present disclosure;

FIG. 4 is a diagram of a system for processing radar data, in accordance with an example embodiment of the present disclosure; and FIG. 5 is a diagram of an algorithm for compensating for a double bounce from stationary objects when operating in same-direction mode, in accordance with an example embodiment of the present disclosure.

DETAILED DESCRIPTION OF THE INVENTION

In the description that follows, like parts are marked throughout the specification and drawings with the same reference numerals. The drawing figures may be to scale and certain components can be shown in generalized or schematic form and identified by commercial designations in the interest of clarity and conciseness.

This application claims benefit of and priority to U.S. Provisional Patent Application No. 63/685,446, filed Aug. 21, 2024, which is hereby incorporated by reference for all purposes as if set forth herein in its entirety.

The present disclosure provides systems and methods for a law enforcement Doppler radar system. Same-direction can refer to the traffic that is traveling in the same direction as the patrol vehicle. This traffic can be faster or slower than the patrol vehicle. The systems and methods of the present disclosure can be used to implement algorithms that identify false Doppler targets in the reflected radar signal. To the extent that a description is provided of a front antenna signal or system, the systems and methods are also intended to be applicable to the rear antenna as well, with appropriate modifications with respect to the traffic direction relative to the patrol vehicle, and vice versus.

It is desirable for police traffic radar to process same direction speeds that are more than 70% of the speed of the patrol vehicle. For example, a patrol vehicle with a speed of 50-mph may need to detect a vehicle with a radar speed detection device that is more than 35-mph faster or slower than the patrol speed. The present disclosure provides systems and methods for generating audio tones that can be heard by an officer to notify the officer of such vehicle speeds. In stationary or moving opposite direction modes, a tone can be generated that is related to the speed of the vehicle, where the pitch increases with the speed. In the same direction mode, the tone can represent the speed difference between the patrol vehicle and the same direction target. For example, if the patrol vehicle is traveling at 70 mph and the target is traveling (relative to the ground) at 90 mph, the officer would hear a tone that equates to 20-mph (the difference between the patrol vehicle and the target vehicle), instead of the normal high pitch tone equating to a true speed of 90-mph. If the patrol vehicle increases in speed to 80-mph, the audio tone drops, since the difference speed is now only 10-mph. This tone generation protocol can be confusing in traffic when operating a same direction radar.

The present disclosure uses the functionality of a directional radar antenna in combination with filtering and processing to enable the difference in the speed of the patrol vehicle and target vehicle to be greater than 70% of patrol speed. The present disclosure allows a police traffic radar unit to detect any same direction vehicle speed if the combined speed with the patrol speed is within the maximum detectable range of the system. For example, for a 50-mph patrol speed, a radar in accordance with the present disclosure could process and display a same direction vehicle coming up from behind or going away from the patrol vehicle at speeds up to 160-mph, if the maximum system speed is 210 mph. For a patrol speed of 70 mph, a radar utilizing the systems and methods disclosed herein could process and display a same direction speed of up to 140-mph.

For a true audio tone in same direction mode, the present disclosure can filter and allow the patrol speed offset to provide the officer with an audio tone they are used to hearing for a particular target speed whether in stationary, moving opposite or moving same direction modes.

Doppler radar systems designed for law enforcement speed detection are susceptible to false targets that can be generated by the moving patrol vehicle itself. This can occur when the transmitted Doppler radar signal is returned directly from a stationary or slow-moving object. The resulting signal can appear as a closing target in the opposite direction that is traveling approximately the same speed as the patrol vehicle. If the stationary or slow-moving object is to the left or right of the patrol vehicle, the cosine errors can cause this false speed to appear slower than the patrol vehicle.

The traditional solution to this problem is to apply a low pass filter to the received Doppler data or use propositional logic to disqualify these signals. This filter or logic method removes Doppler signals in the range of the patrol vehicle speed and higher. The corner frequency threshold is typically placed at the patrol speed with an additional cosine offset of 45 degrees to allow for cosine error due to objects to the side of the roadway or as the patrol vehicle passes the object, which can result in the previously-described 70% patrol speed filter.

FIG. 1 is a diagram 100 of a vehicle configuration illustrating concepts related to an example embodiment of the present disclosure. A single bounce of a transmitted radar signal from a stationary object such as an overpass and moving police vehicle 102 with Doppler radar can cause the Doppler radar to generate a signal that could be interpreted as a phantom target vehicle 104 closing in the opposite direction and traveling at the same speed as patrol vehicle 102, unless the systems and methods of the present disclosure are used to identify and eliminate that false signal. Prior art systems and methods avoid this region of operation.

False signals can also be generated when the Doppler radar signal encounters more than one object on its return path to the radar receiver, which can be referred to as a double bounce. Double bounce signals can combine with the patrol speed in unexpected ways and can generate false same-direction target signals that appear to be traveling away from the patrol vehicle. The 70% filter removes double bounce signals, but can also mask real vehicles in the same direction traveling away from the patrol vehicle.

FIG. 2 is a diagram 200 of a vehicle configuration illustrating concepts related to an example embodiment of the present disclosure. Double bounce of a Doppler radar signal transmitted to an opposite direction traffic vehicle 204 by a stationary object such as an overpass from moving police vehicle 202 can create a phantom same-direction vehicle 206 traveling at the same speed as the opposite direction vehicle. The 70% filter removes double bounce signals, but can also mask real vehicles in the same direction traveling away from the patrol vehicle.

FIG. 3 is a diagram 300 of a vehicle configuration illustrating concepts related to an example embodiment of the present disclosure. Double bounce of a Doppler radar signal transmitted between an opposite lane second vehicle 306, a same-direction first vehicle 304 and a moving police vehicle 302 with Doppler radar can create a phantom same-direction vehicle 308 traveling at nearly the same speed as the opposite direction vehicle when uncompensated. The 70% filter removes double bounce signals, but can also mask real vehicles in the same direction traveling away from the patrol vehicle.

If a second, or rear antenna is not available, an alternate approach for double bounce situations is to monitor the opposite direction traffic in the front antenna. This traffic eventually becomes the rear opposite direction traffic. After a reasonable period, this data can be used to compare combined double bounce speeds to eliminate same direction away targets. This scenario can be used to extend the disqualification range to be wider, as needed.

FIG. 4 is a diagram of a system 400 for processing radar data, in accordance with an example embodiment of the present disclosure. In one example embodiment, the present disclosure can be used to replace the 70% low pass filter that would normally be used to process the output of Doppler radar system 402 with notch filter 404, which is centered on the patrol speed frequency. Notch filter 404 generates the entire spectrum of target speeds. The same direction, single bounce closing speeds generated by Doppler radar system 402 are then eliminated using propositional logic 406 to generate output 408.

Doppler radar system 402 can be implemented in hardware or a suitable combination of hardware and software, and can include one or more algorithms operating on Doppler radar data. In one example embodiment, Doppler radar system 402 can be implemented as one or more of U.S. Pat. Nos. 5,528,245; 5,563,603; 5,525,996; 5,570,093; 5,565, 871; 7,227,494; 20 7,038,614; 8,138,966; 7,864,102; 8,378, 884; 5,691,724; 6,198,427; 6,646,591; 7,068,212; 6,744, 379; 6,580,386; 6,831,593; 7,411,544; 6,853,314; 7,068, 212, 7,218,271 and 12,066,534, each of which are hereby incorporated by reference for all purposes as if set forth herein in their entireties.

Notch filter 404 can be implemented in hardware or a suitable combination of hardware and software, and can include one or more algorithms operating on Doppler radar data. In one example embodiment, notch filter 404 can be added to Doppler radar system 402 as an alternate processing pathway. In another example embodiment, notch filter 404 can replace one or more low pass filters in Doppler radar system 402 as disclosed in the U.S. Patents that are incorporated by reference, or other suitable embodiments can also or alternatively be used.

Propositional logic 406 can be implemented in hardware or a suitable combination of hardware and software, and can first determine whether the Doppler radar system 402 is being operated in a same direction mode. If so, then any closing targets that are 70% of the patrol speed or higher can be eliminated by propositional logic 406. For the remainder of the spectrum, different propositional logic can be used, a low pass filter can be used or other suitable configurations can also or alternatively be used.

FIG. 5 is a diagram of an algorithm 500 for compensating for a double bounce from stationary objects when operating in same-direction mode, in accordance with an example embodiment of the present disclosure. Algorithm 500 can be implemented in hardware or a suitable combination of hardware and software.

Algorithm 500 begins at 502, where a front antenna signal is measured. In one example embodiment, the front antenna can transmit a radar signal and can measure a return signal, multiple front antennas can be used or other suitable embodiments can also or alternatively be used. The algorithm then proceeds to 504.

At 504, targets are identified in the front antenna signal (F-T). In one example embodiment, the targets can be identified by converting the antenna signal to a digital data signal and processing the digital data signal to identify frequency components that are used to identify targets and speeds, as discussed in the materials incorporated by reference above. Likewise, other suitable processes can also or alternatively be used. The algorithm then proceeds to 506.

At 506, a rear antenna signal is measured. In one example embodiment, the rear antenna can transmit a radar signal and can measure a return signal, multiple rear antennas can be used or other suitable embodiments can also or alternatively be used. The algorithm then proceeds to 508.

At 508, targets are identified in the rear antenna signal (R-T). In one example embodiment, the targets can be identified by converting the antenna signal to a digital data signal and processing the digital data signal to identify frequency components that are used to identify targets and speeds, as discussed in the materials incorporated by reference above. Likewise, other suitable processes can also or alternatively be used. The algorithm then proceeds to 510.

At 510, a patrol speed (P-V) is identified. In one example embodiment, the patrol speed can be determined from the front antenna signal, the rear antenna signal, a speedometer or other suitable sources. The algorithm then proceeds to 512.

At 512, it is determined whether a target should be tracked, such as using propositional logic or in other suitable manners. Targets that are detected in the front antenna signal (F-T) can have a speed that can be correlated with the combined speeds of the patrol vehicle (P-V) and an opposite direction away target, measured in the rear antenna (R-T). For example, if F-T=P-V+R-T or P-V−R-T, then the target can be eliminated or tracked determine whether the identified correlation to other targets persists over time. If it is determined that the target should be tracked, the algorithm returns to 502, otherwise the algorithm proceeds to 514.

At 514, it is determined whether to eliminate the target using the above logic or in other suitable manners. If it is determined that the target can be eliminated, the target is eliminated and the algorithm proceeds to 516 where a display is generated without the target. If it is determined that the target should not be eliminated, the algorithm proceeds to 516 where a display is generated with the target.

In operation, algorithm 500 can be used to extend the range of detectable away targets to the entire spectrum, to delete phantom targets and to unmask the real same direction away targets that were disqualified prior to this enhancement.

In another example embodiment, false signals generated by a double bounce between two moving objects can be avoided. An away target detected in the front antenna (F-T) can be eliminated when the speed is correlated with the combined speeds of the patrol vehicle (P-V) and other vehicles, such as a strong same-direction vehicle 304 and an opposite direction away target vehicle 306, measured in the rear antenna. For example, if F-T=P-V+ the signal from the first vehicle or P-V—the signal from the first vehicle, or if F-T=P-V+ the signal from the second vehicle or P-V—the signal from the second vehicle, then the target can be eliminated or tracked determine whether the identified correlation to other targets persists over time. This example embodiment can also be used to extend the detectable away targets to the entire spectrum.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more micro-computers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or s for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for radar speed detection, comprising:
a front antenna system configured to transmit a first radar signal and to receive a reflected first radar signal;
a rear antenna system configured to transmit a second radar signal and to receive a reflected second radar signal;
a patrol speed system configured to generate a patrol speed; and
a logic processing system configured to identify first vehicle signals in the reflected first radar signal and second vehicle signals in the reflected second radar signal and to eliminate signals as a function of the first vehicle signals, the second vehicles signals and the patrol speed.

2. The system of claim 1 wherein the front antenna system comprises a notch filter.

3. The system of claim 1 wherein the rear antenna system comprises a notch filter.

4. The system of claim 1 wherein the patrol speed system receives the reflected first radar signal and identifies the patrol speed in the reflected first radar signal.

5. The system of claim 1 wherein the patrol speed system receives the reflected second radar signal and identifies the patrol speed in the reflected second radar signal.

6. The system of claim 1 wherein the patrol speed system receives the reflected first radar signal and the reflected second radar signal and identifies the patrol speed in the reflected first radar signal and the reflected second radar signal.

7. The system of claim 1 wherein the logic processing system is configured to track a signal over time before deciding whether to eliminate the signal.

8. The system of claim 1 wherein the logic processing system is configured to determine whether a first speed of a vehicle from the front antenna signal equals the patrol speed plus a second speed of a vehicle from the rear antenna signal.

9. The system of claim 1 wherein the logic processing system is configured to determine whether a first speed of a vehicle from the front antenna signal equals the patrol speed minus a second speed of a vehicle from the rear antenna signal.

10. The system of claim 1 wherein the logic processing system is configured to determine whether a first speed of a first vehicle or a second vehicle from the front antenna signal equals the patrol speed plus a second speed of a first vehicle or a second vehicle from the rear antenna signal.

11. A method for radar speed detection, comprising:
transmitting a first radar signal and receiving a reflected first radar signal;
transmitting a second radar signal and receiving a reflected second radar signal;
generating a patrol speed;
identifying first vehicle signals in the reflected first radar signal and second vehicle signals in the reflected second radar signal; and
eliminating signals as a function of the first vehicle signals, the second vehicles signals and the patrol speed.

12. The method of claim 11 wherein identifying first vehicle signals in the reflected first radar signal comprises using a notch filter.

13. The method of claim 11 wherein identifying second vehicle signals in the reflected second radar signal comprises using a notch filter.

14. The method of claim 11 wherein a patrol speed system receives the reflected first radar signal and identifies the patrol speed in the reflected first radar signal.

15. The method of claim 11 wherein a patrol speed system receives the reflected second radar signal and identifies the patrol speed in the reflected second radar signal.

16. The method of claim 11 wherein a patrol speed system receives the reflected first radar signal and the reflected second radar signal and identifies the patrol speed in the reflected first radar signal and the reflected second radar signal.

17. The method of claim 11 further comprising tracking a signal over time before deciding whether to eliminate the signal.

18. The method of claim 11 further comprising determining whether a first speed of a vehicle from a front antenna signal equals the patrol speed plus a second speed of a vehicle from a rear antenna signal.

19. The method of claim 11 further comprising determining whether a first speed of a vehicle from a front antenna signal equals the patrol speed minus a second speed of a vehicle from a rear antenna signal.

20. The method of claim 11 further comprising determining whether a first speed of a first vehicle or a second vehicle from a front antenna signal equals the patrol speed plus a second speed of a first vehicle or a second vehicle from a rear antenna signal.

* * * * *